(12) United States Patent
Hamaguchi

(10) Patent No.: US 9,075,752 B2
(45) Date of Patent: Jul. 7, 2015

(54) INFORMATION PROCESSING APPARATUS THAT DETECTS STARTUP ERROR, METHOD OF CONTROLLING THE SAME, AND STORAGE MEDIUM

(75) Inventor: Jun Hamaguchi, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 242 days.

(21) Appl. No.: 13/461,990

(22) Filed: May 2, 2012

(65) Prior Publication Data

US 2012/0290884 A1 Nov. 15, 2012

(30) Foreign Application Priority Data

May 9, 2011 (JP) ................................ 2011-104367

(51) Int. Cl.
| | | |
|---|---|---|
| *G06F 11/00* | (2006.01) | |
| *G06F 11/14* | (2006.01) | |
| *G06F 1/00* | (2006.01) | |
| *G06F 11/07* | (2006.01) | |

(52) U.S. Cl.
CPC .............. *G06F 11/1417* (2013.01); *G06F 1/00* (2013.01); *G06F 11/0721* (2013.01); *G06F 11/0751* (2013.01); *G06F 11/0793* (2013.01)

(58) Field of Classification Search
CPC .... H04B 17/004; H04B 17/0062; G06F 1/00; G06F 2101/00; G06F 11/0721; G06F 11/0751; G06F 11/0793
See application file for complete search history.

(56) References Cited

U.S. PATENT DOCUMENTS

| | | | | |
|---|---|---|---|---|
| 6,412,068 | B1 * | 6/2002 | Nolan et al. ....................... | 713/1 |
| 6,647,218 | B2 * | 11/2003 | Takayama ....................... | 399/33 |
| 7,417,529 | B2 * | 8/2008 | Shima ...................... | 340/286.01 |
| 7,493,482 | B2 * | 2/2009 | Ring et al. ......................... | 713/1 |
| 8,083,146 | B2 * | 12/2011 | Carlson et al. ................. | 235/454 |
| 8,250,574 | B2 * | 8/2012 | Baba .................................. | 718/1 |
| 8,558,858 | B2 * | 10/2013 | Kubo ............................. | 347/134 |
| 2001/0044841 | A1 | 11/2001 | Kosugi et al. | |
| 2005/0235049 | A1 * | 10/2005 | Liu ............................... | 709/219 |
| 2012/0130553 | A1 * | 5/2012 | Purani et al. ................... | 700/287 |
| 2012/0166821 | A1 * | 6/2012 | Tan et al. ....................... | 713/300 |

(Continued)

FOREIGN PATENT DOCUMENTS

| | | |
|---|---|---|
| JP | 02-059955 A | 2/1990 |
| JP | 06348521 A | 12/1994 |

(Continued)

OTHER PUBLICATIONS

Japanese Office Action cited in Japanese counterpart Appl. No. JP2011104367, dated Mar. 3, 2015.

*Primary Examiner* — Amine Riad
(74) *Attorney, Agent, or Firm* — Rossi, Kimms & McDowell LLP

(57) ABSTRACT

An information processing apparatus which includes at least two controllers and is capable of positively detecting a startup error. Memory devices are connected to the controllers, respectively. A CPU of each controller accesses the memory device connected to the other controller via a bus bridge, identifies a startup stage to which the startup process has proceeded during the start of the self-controller, writes the identified startup stage as startup information into the memory device connected to the other controller, and detects whether or not an abnormality occurs during the startup of the other controller with reference to the startup information written into the memory device connected to the self-controller.

7 Claims, 9 Drawing Sheets

(56) References Cited

U.S. PATENT DOCUMENTS

| | | | |
|---|---|---|---|
| 2012/0198102 A1* | 8/2012 | Saito | 710/14 |
| 2013/0111072 A1* | 5/2013 | Takeuchi et al. | 710/10 |
| 2013/0268796 A1* | 10/2013 | Yang | 713/340 |
| 2014/0208333 A1* | 7/2014 | Beals et al. | 719/318 |
| 2014/0297834 A1* | 10/2014 | Tripathi et al. | 709/224 |

FOREIGN PATENT DOCUMENTS

| | | |
|---|---|---|
| JP | 08249212 A | 9/1996 |
| JP | 2001325124 A | 11/2001 |
| JP | 2008-187288 A | 8/2008 |
| JP | 2010-224751 A | 10/2010 |

* cited by examiner

FIG.6A

| Startup Halt Position 601 | Startup Halt Name 602 | Startup Detection CPU 603 | Abnormality Notification Device 604 | Information Holding Location 605 |
|---|---|---|---|---|
| M=0→1 | HALTED DURING EXECUTION OF BIOS | MAIN | ELECTRIC POWER STATUS LED FLASH ONCE REPEATEDLY AT SHORT TIME INTERVALS | NONE (606) |
| M=1→2 | HALTED DURING BOOT LOADER PROCESSING | MAIN | ELECTRIC POWER STATUS LED FLASH TWICE REPEATEDLY AT SHORT TIME INTERVALS | FLASHROM (607) |
| M=2→3 | HALTED DURING KERNEL PROCESSING | MAIN | ELECTRIC POWER STATUS LED FLASH THREE TIMES REPEATEDLY AT SHORT TIME INTERVALS | FLASHROM (608) |
| M=3→4 | HALTED DURING SUB LOADER PROCESSING | MAIN | LCD PANEL NOT LANGUAGE-LOCALIZED | FLASHROM (609) |
| M=4→5 | HALTED DURING OS SERVICE PROCESSING | MAIN | LCD PANEL NOT LANGUAGE-LOCALIZED | FLASHROM (610) |
| S=0→1 | HALTED DURING OS PROCESSING | SUB | LCD PANEL NOT LANGUAGE-LOCALIZED | FLASHROM (611) |
| M=5→6 | HALTED DURING ELECTRIC POWER CONTROL STARTUP PROCESS | MAIN | IN-EXECUTION LED FLASH FIVE TIMES AT SHORT TIME INTERVALS | SRAM (612) |
| S=1→2 | HALTED DURING IMAGE PROCESSING CONTROL STARTUP PROCESS | MAIN | LCD PANEL NOT LANGUAGE-LOCALIZED | SRAM (613) |

FIG.6B

| STARTUP HALT POSITION 601 | STARTUP HALT NAME 602 | STARTUP DETECTION CPU 603 | ABNORMALITY NOTIFICATION DEVICE 604 | INFORMATION HOLDING LOCATION 605 |
|---|---|---|---|---|
| M=6→7 | HALTED DURING DATA PROCESSING CONTROL STARTUP PROCESS | SUB | LCD PANEL NOT LANGUAGE-LOCALIZED IN-EXECUTION LED | SRAM — 614 |
| S=2→3 | HALTED DURING ENGINE STARTUP | MAIN | LANGUAGE-LOCALIZED LCD PANEL | SRAM — 615 |
| M=7→8 | HALTED DURING JOB CONTROL PROCESSING | SUB | LANGUAGE-LOCALIZED LCD PANEL IN-EXECUTION LED | SRAM — 616 |
| S=3→4 | HALTED DURING FACSIMILE STARTUP | MAIN | LANGUAGE-LOCALIZED LCD PANEL | SRAM — 617 |
| S=4→END | HALTED DURING FINAL STARTUP | MAIN | LANGUAGE-LOCALIZED LCD PANEL | SRAM — 618 |
| M=8→9 | HALTED DURING DISPLAY AND OPERATION CONTROL INITIALIZATION PROCESS | SUB | LANGUAGE-LOCALIZED LCD PANEL IN-EXECUTION LED | SRAM — 619 |
| M=9→10 | HALTED DURING NETWORK CONTROL INITIALIZATION PROCESS | SUB | LANGUAGE-LOCALIZED LCD PANEL WITH GUI DISPLAY | SRAM — 620 |
| M10→END | HALTED DURING PDL CONTROL INITIALIZATION PROCESS | SUB | LANGUAGE-LOCALIZED LCD PANEL WITH GUI DISPLAY NETWORK NOTIFICATION POSSIBLE | SRAM — 621 |

INFORMATION PROCESSING APPARATUS THAT DETECTS STARTUP ERROR, METHOD OF CONTROLLING THE SAME, AND STORAGE MEDIUM

BACKGROUND OF THE INVENTION

1. Field of the Invention

The present invention relates to an information processing apparatus, a method of controlling the same, and a storage medium.

2. Description of the Related Art

In general, as an example of an information processing apparatus, there may be mentioned an image forming apparatus, such as a multifunction peripheral (MFP). In recent years, along with development of the information processing technique, main processing performed by the image forming apparatus is shifting from image processing to information processing. Further, it has become general to configure an image forming apparatus such that an image processing processor required to be controlled on a real-time basis and an information processing processor for processing communication and user interface are made separate from each other.

According to the above-mentioned separation of the processors, memory devices are connected to the processors, respectively. However, a memory device sometimes erroneously operates due to a contact failure caused by vibrations at the time of installation work of the apparatus or attachment of conductive floating dust to the memory device. Particularly, when the entire image forming apparatus is considered, as the number of memory devices increases, a risk of an erroneous operation becomes higher. Further, an erroneous operation (abnormal operation) caused by a contact failure or a short circuit of the memory device causes a most serious problem of display screen freezing during a startup process of the image forming apparatus, resulting in the incapability of startup of the apparatus.

As described above, when the entire image processing apparatus cannot be started up e.g. due to the contact failure of the memory device, it is required to perform notification of the abnormal state and immediately cope with the problem.

By the way, there has been proposed an image forming apparatus that detects an abnormal voltage and stores the history of the detected abnormal voltage in a nonvolatile memory (see e.g. Japanese Patent Laid-Open Publication No. 2008-187288).

Further, there has been proposed an image forming apparatus that is provided with a plurality of processors, and is configured to cause the processors to monitor each other and reconstruct the monitoring system when an abnormality is detected (see e.g. Japanese Patent Laid-Open Publication No. H02-59955).

Furthermore, there has been proposed an image forming apparatus that is provided with a plurality of processors each of which records events having occurred therein in a volatile memory as a log, and then stores the events in a nonvolatile memory at a predetermined timing (see e.g. Japanese Patent Laid-Open Publication No. 2010-224751).

In Japanese Patent Laid-Open Publication No. 2008-187288, when an output voltage of a power supply circuit is detected, it is detected whether or not the output voltage is abnormal, at a predetermined period. However, in this publication, only detection of an abnormality of the output voltage is performed, and hence when a faulty connection occurs in the memory device, the image forming apparatus cannot be started up. As a consequence, there is a problem that in such a case, an abnormality of the output voltage cannot be detected. Under such a situation, even when the voltage detection operation is normal, the image forming apparatus cannot be started up.

On the other hand, in Japanese Patent Laid-Open Publication No. H02-59955 and Japanese Patent Laid-Open Publication No. 2010-224751, the plurality of processors share information using a shared memory. Further, in Japanese Patent Laid-Open Publication No. H02-59955, the plurality of processors monitor each other by recording monitoring link information in the shared memory, and when an abnormality is detected, the monitoring system is reconstructed and the monitoring link information is stored in the shared memory. In Japanese Patent Laid-Open Publication No. 2010-224751, an event is stored using the shared memory, and then is logged into a nonvolatile memory for synchronization.

However, when an abnormality occurs in the memory device, information stored in the shared memory may be destroyed or may not be correctly read. In both Japanese Patent Laid-Open Publication No. H02-59955 and Japanese Patent Laid-Open Publication No. 2010-224751, only one system of the shared memory is provided, and hence if the memory device as the shared memory has an abnormality, a startup error cannot be detected. Further, if an abnormality occurs at the startup of the image forming apparatus, there is no guarantee that the abnormality detection function, which is expected to operate in a state in which the image forming apparatus has been normally started up, normally operates.

SUMMARY OF THE INVENTION

The present invention provides an information processing apparatus which includes at least two controllers and is capable of positively detecting a startup error, a method of controlling the information processing apparatus, and a storage medium.

In a first aspect of the present invention, there is provided an information processing apparatus that includes at least two controllers, each of which shares job processing, comprising memory devices which are connected to the controllers, respectively, and an access unit for accessing from one of the controllers to one of the memory devices which is connected to the other of the controllers, wherein each controller comprises an identification unit configured to identify a startup stage to which the startup process has proceeded during the startup of the self-controller, a writing unit configured to write a startup stage identified by the identification unit as startup information into the memory device connected to the other controller by the access unit, and an abnormality detection unit configured to detect whether or not an abnormality has occurred in the startup of the other controller with reference to the startup information written into the memory device connected to the self-controller.

In a second aspect of the present invention, there is provided a method of controlling an information processing apparatus including at least two controllers to which memory devices are connected, respectively, each controller sharing job processing, and an access unit for accessing from one of the controllers to one of the memory devices which is connected to the other of the controllers, comprising identifying a startup stage to which the startup process of one of the controllers has proceeded during the startup of the one controller, writing a startup stage identified by the identifying as startup information into one of the memory devices connected to the other controller by the access unit, and detecting whether or not an abnormality has occurred in the startup of the other controller with reference to the startup information written into the memory device connected to the one controller.

In a third aspect of the present invention, there is provided a non-transitory computer-readable storage medium storing a computer-executable program for executing a method of controlling an information processing apparatus including at least two controllers to which memory devices are connected, respectively, each controller sharing job processing, and an access unit for accessing from one of the controllers to one of the memory devices which is connected to the other of the controllers, wherein the control method comprises identifying a startup stage to which the startup process of one of the controllers has proceeded during the startup of the one controller, writing a startup stage identified by the identifying as startup information into one of the memory devices connected to the other controller by the access unit, and detecting whether or not an abnormality has occurred in the startup of the other controller with reference to the startup information written into the memory device connected to the one controller.

The present invention provides an advantageous effect that the information processing apparatus including at least two controllers is capable of positively detecting a startup error.

Further features of the present invention will become apparent from the following description of exemplary embodiments with reference to the attached drawings.

BRIEF DESCRIPTION OF THE DRAWINGS

FIG. 6 is a diagram showing an example of an abnormality detection determination table for use in abnormality notification in an abnormality detection process executed in the startup monitoring process shown in FIG. 5.

DESCRIPTION OF THE EMBODIMENTS

The present invention will now be described in detail below with reference to the accompanying drawings showing embodiments thereof. The following description will be given of an image forming apparatus as one of information processing apparatuses, by way of example.

Figure 1:
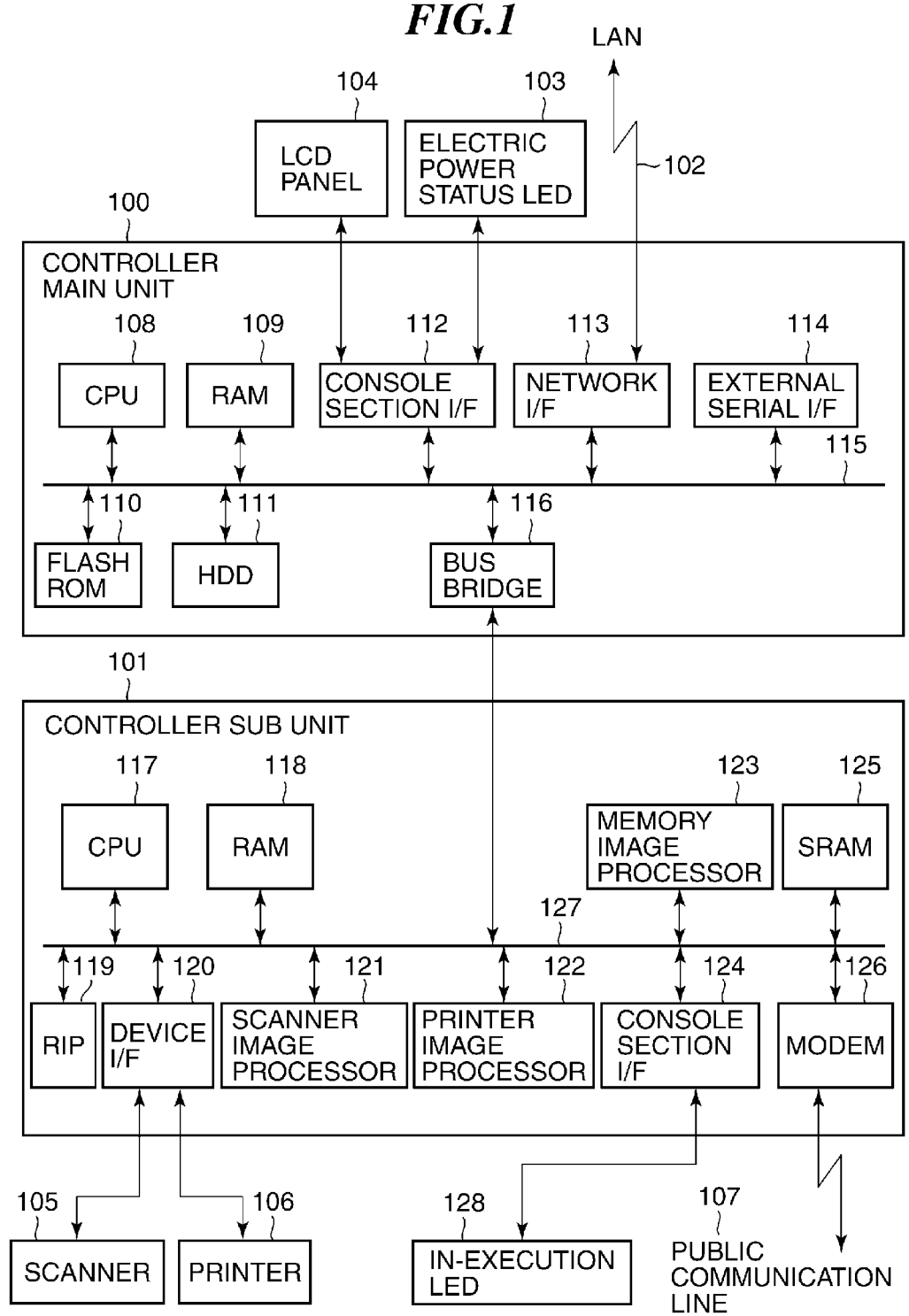
FIG. 1 is a block diagram showing a hardware configuration of an image forming apparatus according to an embodiment of the present invention.

FIG. 1 is a block diagram showing a hardware configuration of the image forming apparatus according to an embodiment of the present invention.

In FIG. 1, the illustrated image forming apparatus includes a controller main unit 100 and a controller sub unit 101. The controller main unit 100 serves as an information processor in the image forming apparatus. The controller sub unit 101 serves as an image processor in the image forming apparatus.

The controller main unit 100 includes a bus bridge 116, and is connected to the controller sub unit 101 via the bus bridge 116.

The controller main unit 100 includes a CPU 108 which executes software (programs) stored in a flash ROM 110 or a HDD 111. The CPU 108 further performs centralized control of devices connected to a system bus 115. The flash ROM 110 and the HDD 111 are also used as storage areas for image data and user settings.

A RAM 109 is used as a main memory and a work area for the CPU 108. A console section interface (I/F) 112 receives instructions inputted from various buttons (not shown) provided on the image forming apparatus, render images on an LCD (liquid crystal display) panel 104 equipped with a touch panel, and receives instructions inputted from the LCD panel 104.

The console section interface 112 is connected to an electric power status LED 103 as well. The electric power status LED 103 is an indicator that indicates the operating conditions of the controller main unit 100.

A network interface card (NIC: also referred to as the network interface) 113 bi-directionally transmits and receives data to and from other network devices, a file server, or the like, via a LAN (local area network) 102. An external storage interface (also referred to as the external serial interface) 114 is e.g. a USB interface, and is connected to an external device, such as a memory media reader or an IC card reader, for bi-directional data transmission and reception.

The controller sub unit 101 includes a CPU 117 which is connected to a scanner 105 and a printer 106. The printer 106 performs printing according to image data using e.g. an electrophotographic process or an inkjet printing method. The scanner 105 reads an image on an original, and gives the scanned image to the controller sub unit 101 as image data. The scanner (image reading unit) 105 includes an automatic document feeder (not shown) which is generally mounted as an option, and is capable of automatically reading a plurality of documents.

The scanner 105 and the printer 106 send and receive image data and respective control signals to and from the CPU 117 via a device interface 120. The CPU 117 performs centralized control of devices connected to a system bus 127. The image data input from the scanner 105 is input to a RAM 118 via a scanner image processor 121 as read image data.

A memory image processor (IMAGEC) 123 processes the image data stored in the RAM 118, and stores the processed image data in the RAM 118 again. This image processing includes image rotation, image magnification, color space conversion, gray scale transformation, image synthesizing, encoding, decoding, and so on.

After image processing is performed by the memory image processor 123 as mentioned above, the CPU 117 stores the image data in the flash ROM 110 or the HDD 111 via the bus bridge 116. Further, the CPU 117 reads the image data stored in the flash ROM 110 or the HDD 111 into the RAM 118 via the bus bridge 116. Then, the CPU 117 causes a printer image processor 122 to perform predetermined processing on the image data, and then causes the processed image data to be delivered to the printer 106.

The scanner image processor 121 and the printer image processor 122 perform processing for color space conversion, transfer, color adjustment, density control, and so on.

A raster image processor (RIP) 119 converts a PDL code to a bit map image. A console section interface 124 controls flashing of an in-execution LED 128 indicative of a state in which processing is in execution. A SRAM (nonvolatile memory) 125 performs inputting and outputting of data to and from the CPU 117 at high speed. A modem (MODEM) 126 is connected to a public communication line 107 to perform modulation and demodulation according to inputting and outputting of a facsimile image.

Figure 2:
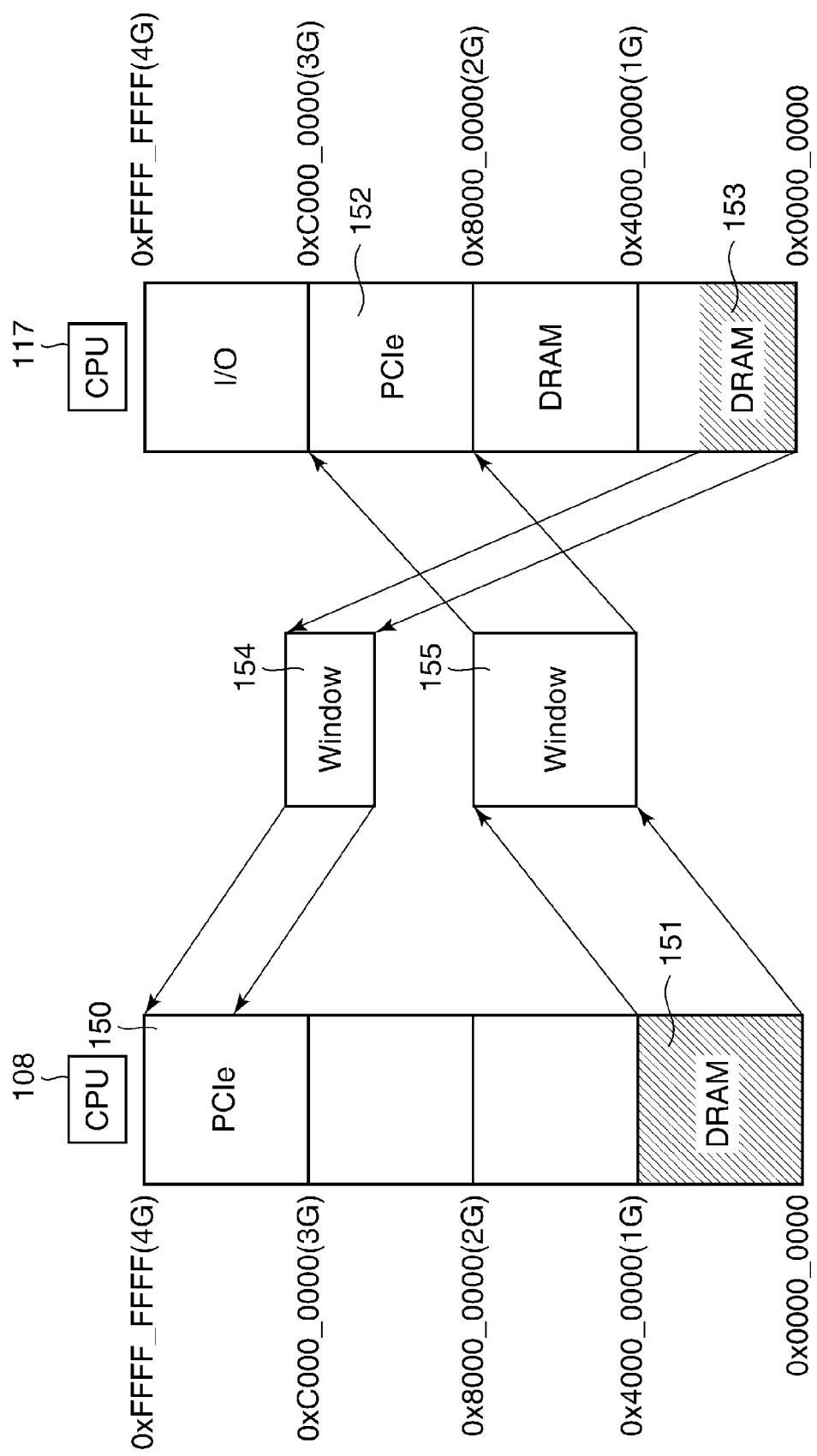
FIG. 2 is a diagram useful in explaining the concept of memory map configuration of the image forming apparatus shown in FIG. 1.

FIG. 2 is a diagram useful in explaining the concept of memory map configuration of the image forming apparatus shown in FIG. 1.

Referring to FIGS. 1 and 2, the CPU 108 uses the RAM (DRAM) 109 physically connected thereto by mapping the same to a lower address space denoted by reference numeral 151. Further, the CPU 108 configures the bus bridge 116 physically connected thereto to thereby map the I/O or memory space of each of the devices on the system bus 127 of the controller sub unit 101 to an upper address space denoted by reference numeral 150.

On the other hand, the CPU 117 uses the RAM (DRAM) 118 physically connected thereto by mapping the RAM 118 to a lower address space denoted by reference numeral 153. Further, the CPU 117 maps the I/O or memory space of each of the devices on the system bus 115 of the controller main unit 100 to an upper address space denoted by reference numeral 152 via the bus bridge 116 physically connected thereto.

The CPU 108 configures the bus bridge 116 to thereby allocate the upper address space 150 to part or all of the area of the DRAM denoted by the reference numeral 153 via a window 154 so as to enable the CPU 108 to read or write data therefrom or therein.

Similarly, the CPU 108 configures the bus bridge 116 to thereby allocate the upper address space 152 to part or all of the area of the DRAM denoted by the reference numeral 151 via a window 155 so as to enable the CPU 117 to read or write data therefrom or therein.

Figure 3A:
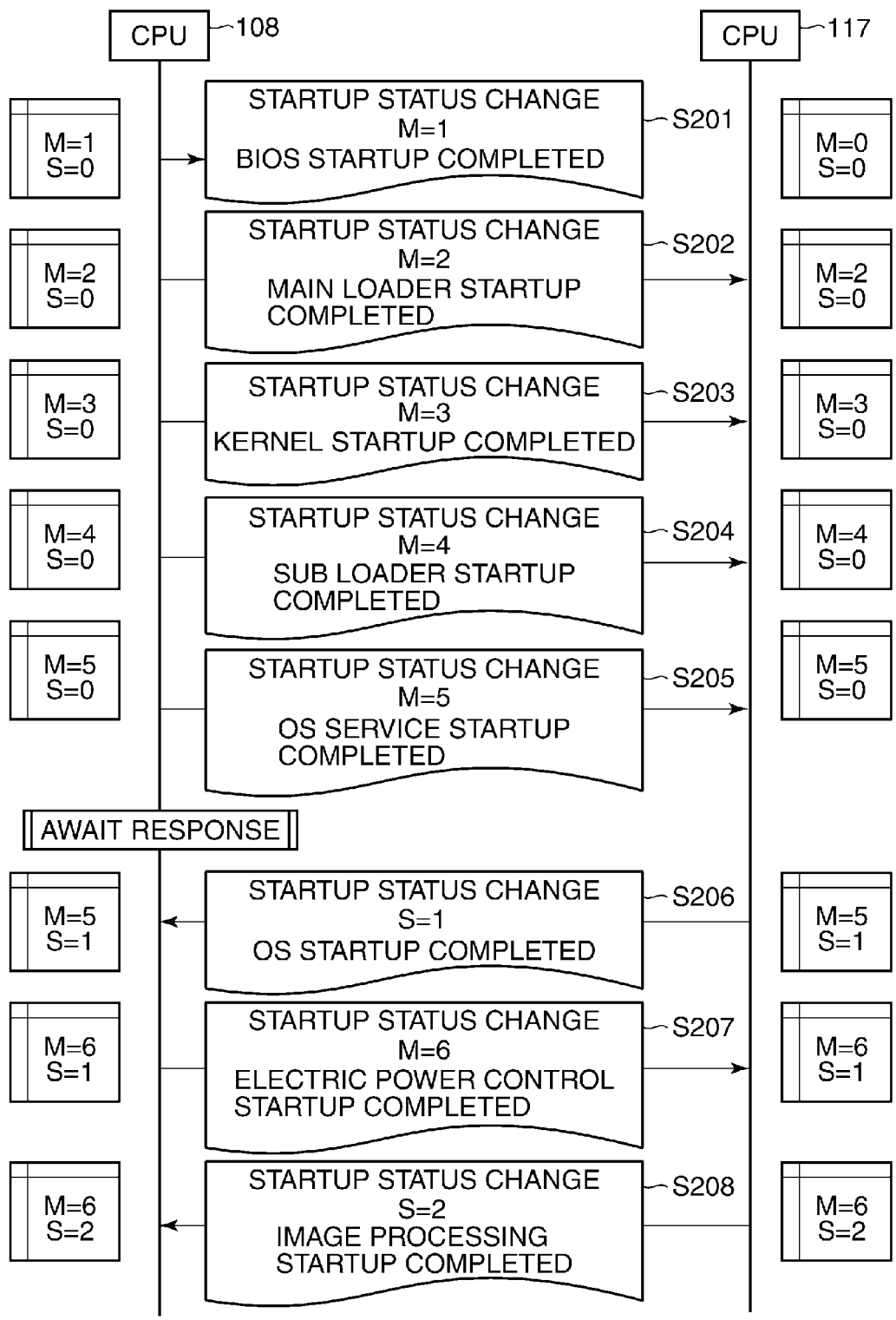
FIGS. 3A and 3B are sequence diagrams useful in explaining a startup sequence of the image forming apparatus shown in FIG. 1.
Figure 3B:
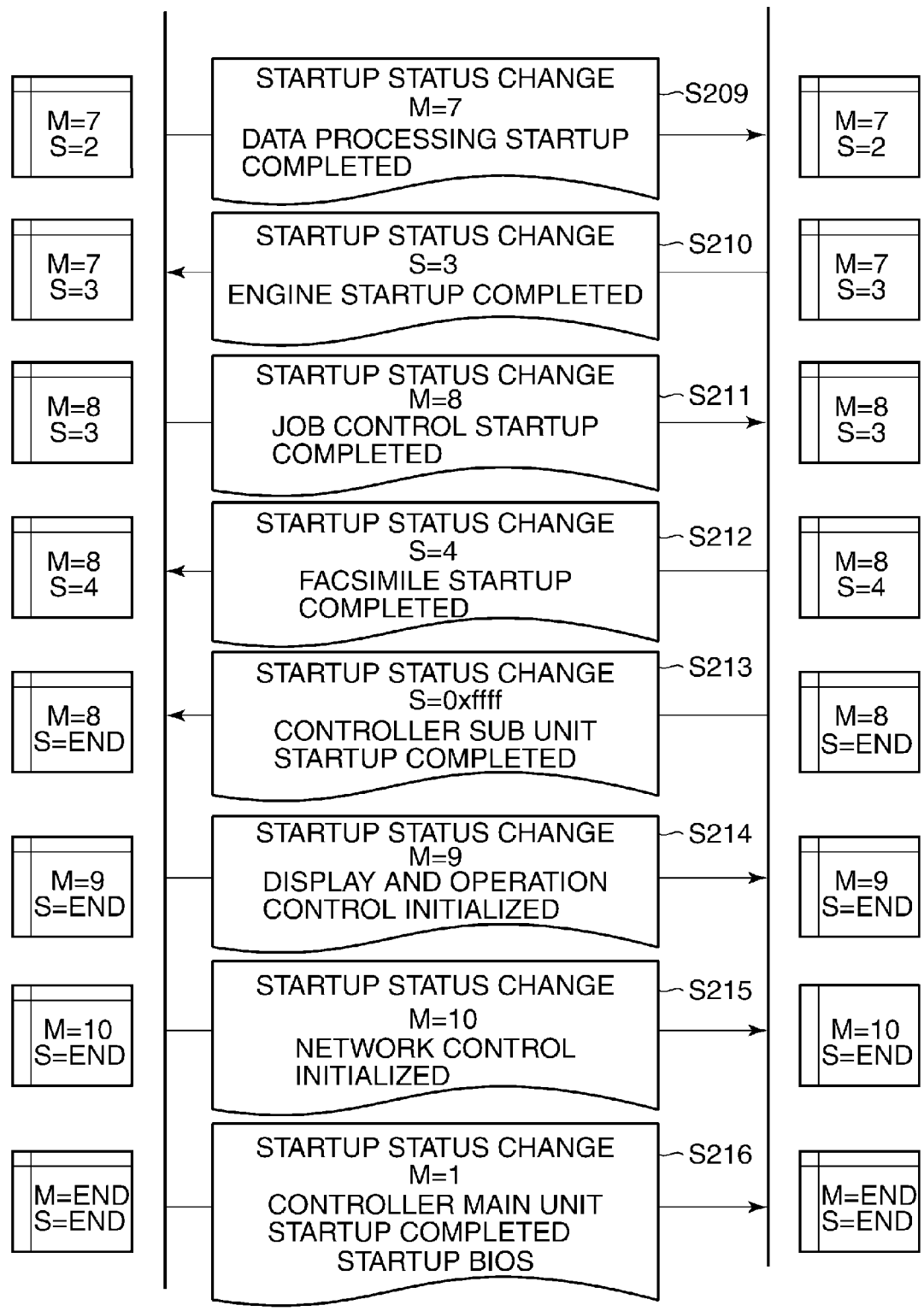

FIGS. 3A and 3B are flow diagrams useful in explaining a startup sequence executed by the image forming apparatus shown in FIG. 1. Although in the illustrated example, the sequence is illustrated such that the steps are sequentially executed, the CPUs 108 and 117 may be configured to operate in parallel.

Referring to FIGS. 1 to 3B, when the startup of the image forming apparatus is instructed by the user, the CPU 108 executes a BIOS (basic input output system) recorded in the flash ROM 110. By execution of the BIOS, the CPU 108 initializes incorporated devices, such as a timer (not shown), the boot device (flash ROM) 110, the memory (RAM) 109, and the video (console section interface) 112, which are connected to the CPU 108.

When initialization of the above-mentioned devices is successful, a startup status of the controller main unit 100 is changed to "BIOS startup completed" (S201). At this time, the CPU 108 records the startup status of "BIOS startup completed" in the memory space 151. Information thus recorded will be described hereinafter.

Next, the CPU 108 executes a primary loader recorded in a MBR (master boot record) stored in the boot device 110. After execution of the primary loader, the CPU 108 executes a secondary loader (kernel loader) stored in the same boot device 110.

The secondary loader includes a process for the above-mentioned configuration of the bus bridge 116, and after the configuration of the bus bridge 116 is completed, the memory space 153 is located in the address space of the CPU 108. This enables the CPU 108 to access the RAM 118.

Subsequently, the CPU 108 reads out a kernel and an initial RAM image (initrd) from the boot device 110. Then, when the readout is successful, the startup status of the controller main unit 100 is changed to "main loader startup completed" (S202). At this time, the CPU 108 records the startup status of "main loader startup completed" in the memory space 151, and records the same status in the memory space 153 via the window 154.

Subsequently, the CPU 108 executes the kernel and the initial RAM image. The CPU 108 initializes hardware via device drivers included in the kernel to thereby mount the initial RAM image. When the mounting is completed, the CPU 108 executes an initial process (initd). When the initial process is successfully activated, the startup status of the controller main unit 100 is changed into "kernel startup completed" (S203). At this time, the CPU 108 records the startup status of "kernel startup completed" in the memory space 151, and records the same status in the memory space 153 via the window 154.

Next, the CPU 108 executes a sub loader by way of the initial process. The CPU 108 transfers a boot image of the CPU 117 included in the sub loader to the RAM 118. When the transfer is completed, the CPU 108 releases the reset of the CPU 117 to thereby enable the CPU 117 to boot. With this, the CPU 117 reads out the execution image (boot image) transferred to the RAM 118, and performs startup processing.

When the processing for starting up the controller sub unit 101 is completed, the startup status of the controller main unit 100 is changed to "sub loader startup completed" (S204). At this time, the CPU 108 records the startup status of "sub loader startup completed" in the memory space 151, and records the same status in the memory space 153 via the window 154.

Subsequently, the CPU 108 starts and executes an OS service through the initial process. The CPU 108 performs initialization for inter-CPU communication by way of the OS service, and waits the CPU 117 to be started up. The initialization of the OS service includes initialization of the LCD panel 104, whereby an image of character-based screen display which has not been localized is rendered and a start screen is displayed in a bit map format.

When the processing for starting the OS service (OS service startup process) is completed, the startup status of the controller main unit 100 is changed to "OS service startup completed" (S205). At this time, the CPU 108 records the startup status of "OS service startup completed" in the memory space 151, and records the same status in the memory space 153 via the window 154.

Next, the CPU 117 executes the OS transferred to the memory space. The CPU 117 initializes the devices on the system bus 127 by execution of the OS, and performs initialization for inter-CPU communication. Then, the CPU 117 responds to the CPU 108.

When activation of the OS is completed, the startup status of the controller sub unit 101 is changed to "OS startup completed" (S206). At this time, the CPU 117 records the startup status of "OS startup completed" in the memory space 153, and records the same status in the memory space 151 via the window 155.

Subsequently, the CPU 108 starts an electric power control process by way of the initial process, and executes the same. By execution of the electric power control process, the CPU 108 performs initialization for electric power control and the overall operation control of the apparatus (electric power control startup process). When the electric power control startup process is completed, the startup status of the controller main unit 100 is changed to "electric power control startup completed" (S207). At this time, the CPU 108 records the startup status of "electric power control startup completed" in the memory space 151, and records the same status in the memory space 153 via the window 154.

Next, the CPU 117 executes an image processing process in order to communicate with the scanner 105 and the printer 106. The CPU 117 initializes image processing devices, such as the scanner image processor 121 and the printer image processor 122, on the system bus 127 by execution of the image processing process, and communicates with the scanner 105 and the printer 106.

When the initialization of the image processing devices (image processing control startup process) is completed, the startup status of the controller sub unit 101 is changed to "image processing startup completed" (S208). At this time, the CPU 117 records the startup status of "image processing startup completed" in the memory space 153, and records the same status in the memory space 151 via the window 155.

Further, the CPU 108 starts and executes a data processing process by execution of the initial process. The CPU 108 performs initialization for controlling data shared between devices, such as security and system configuration, setting values, logs, and documents, by execution of the data processing process.

When the data processing process start and execution (data processing control startup process) is completed, the startup status of the controller main unit 100 is changed to "data processing startup completed" (S209). At this time, the CPU 108 records the startup status of "data processing startup completed" in the memory space 151, and records the same status in the memory space 153 via the window 154.

Next, the CPU 117 executes the initial operation of the scanner 105 and the printer 106. The CPU 117 communicates with the scanner 105 and the printer 106 by execution of the image processing process to perform initial color adjustment and operation verification.

When enabling of normal operations of the scanner 105 and the printer 106 (engine startup process) has been completed, the startup status of the controller sub unit 101 is changed to "engine startup completed" (S210). At this time, the CPU 117 records the startup status of engine start completion in the memory space 153, and records the same status in the memory space 151 via the window 155.

Subsequently, the CPU 108 starts and executes a job processing process by execution of the initial process. The CPU 108 acquires the configurations of the scanner 105 and the printer 106 by execution of the job processing process, and performs initialization for job control. The initialization for the job control includes facsimile communication control, and the CPU 108 communicates with the CPU 117 to request initialization of the facsimile function.

When the job processing process start and execution (job control startup process) is completed, the startup status of the controller main unit 100 is changed to "job control startup completed" (S211). At this time, the CPU 108 records the startup status of "job control startup completed" in the memory space 151, and records the same status in the memory space 153 via the window 154.

Next, when the CPU 117 receives the facsimile initialization request from the CPU 108, the CPU 117 executes a facsimile initialization process. The CPU 117 initializes the MODEM 126 by execution of the facsimile processing process, and verifies the operation of the MODEM 126. When the facsimile function has become capable of normal operation, the startup status of the controller sub unit 101 is changed to "facsimile startup completed" (S212). At this time, the CPU 117 records the startup status of "facsimile startup completed" in the memory space 153, and records the same status in the memory space 151 via the window 155.

Then, when the CPU 117 executes a startup final process (remaining startup processes) to thereby complete all the startup processes, it enters a job standby state in which all kinds of jobs can be accepted. The startup status of the controller sub unit 101 is changed to "controller sub unit startup completed" (S213). At this time, the CPU 117 records the startup status of "controller sub unit startup completed" in the memory space 153, and records the same status in the memory space 151 via the window 155.

Next, the CPU 108 starts and executes a display and operation control initialization process by execution of the initial process. The CPU 108 performs initialization for controlling the screen output and the operational input by execution of the display and operation control initialization process. By initializing display processing control, the CPU 108 performs rendering of images of localized graphical screen display for the LCD panel 104.

The CPU 108 starts applications for menu, copy, scan, facsimile, and so forth, by executing operation control processing. When the display and operation control initialization process is thus completed, the startup status of the controller main unit 100 is changed to "display and operation control initialized" (S214). At this time, the CPU 108 records the startup status of "display and operation control initialized" in the memory space 151, and records the same status in the memory space 153 via the window 154.

Subsequently, the CPU 108 starts a network control initialization process by execution of the initial process. The CPU 108 performs initialization for protocol control via the LAN 102 by execution of the network control initialization process.

The CPU 108 starts applications for PDL print, a web server, and so forth, by execution of the network processing process. When the network processing process start and execution is completed, the startup status of the controller main unit 100 is changed to "network control initialized" (S215). At this time, the CPU 108 records the startup status of "network control initialized" in the memory space 151, and records the same status in the memory space 153 via the window 154.

Subsequently, when all of the start processes are completed, the CPU 108 enters an operation standby state. The startup status of the controller main unit 100 is changed to "controller main unit startup completed" (S216). At this time, the CPU 108 records the startup status of "controller main unit startup completed" in the memory space 151, and records the same status in the memory space 153 via the window 154.

In the normal operation, the startup process is completed by the above-described startup sequence. On the other hand, if the initialization fails or the hardware suffers from an abnormality during the startup process, the startup status of each of the CPUs 108 and 117 does not proceed but halts at a predetermined status.

Figure 4:
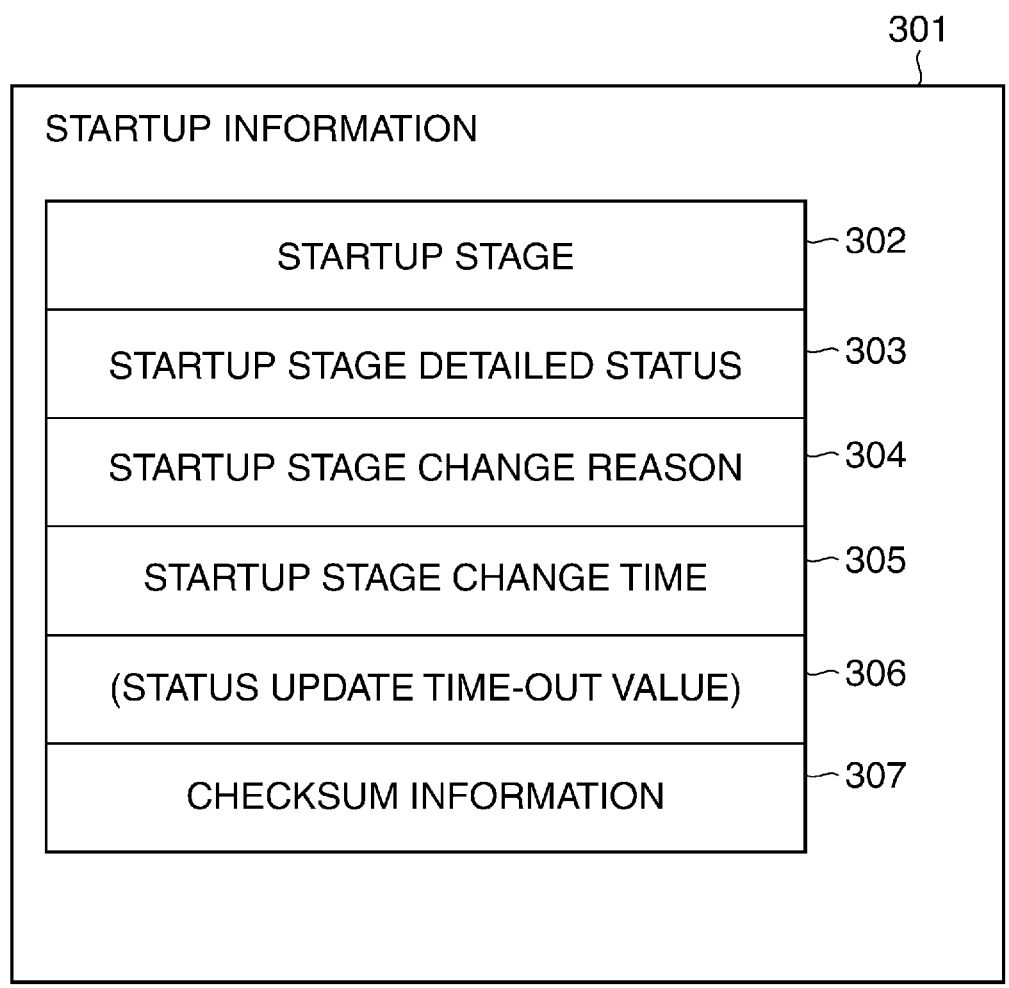
FIG. 4 is a diagram showing a startup status management table stored in the image forming apparatus shown in FIG. 1.

FIG. 4 is a diagram showing a management table (startup status management table) of the startup status stored in the image forming apparatus shown in FIG. 1.

In FIG. 4, the startup status management table (also referred to as the startup information) denoted by reference numeral 301 holds detailed data indicative of the startup status described with reference to FIGS. 3A and 3B. The CPU 108 updates the startup status of the CPU 108 stored in the RAM 109 and stored in the RAM 118 via the window 154, according to the structure of the startup status management table 301.

The CPU 117 updates the startup status of the CPU 117 stored in the RAM 118 and stored in the RAM 109 via the window 155, according to the structure of the startup status management table 301.

The startup status management table 301 includes startup stage information (startup stage) 302, which is a number (M) allocated to each of the startup stages of the controller main unit 100 and the controller sub unit 101. A startup stage detailed status information (startup stage detailed status) 303 is a number allocated, when a further detailed startup stage exists in one of the startup stages of the controller main unit 100 and the controller sub unit 101, to the detailed startup stage. For example, if it is during initialization of the image processing, the numbers are allocated in descending order according to the number of the devices to be initialized.

A startup stage change reason information (startup stage change reason) 304 is a number allocated to each of reasons of update when the startup stage information 302 is updated for the controller main unit 100 and the controller sub unit 101. Therefore, the startup stage change reason information 304 is in the form of a code which means e.g. normal termination, abnormal termination due to a system factor, abnormal termination due to a user factor, and abnormal termination due to a hardware factor.

A startup stage change time information (startup stage change time) 305 indicates a time at which the startup stage information 302 is updated. A checksum information 307 indicates a checksum of the entire record for discriminating whether or not the content of the startup status management table 301 is valid.

Further, the startup status management table 301 may include a status update time-out information (status update time-out value) 306. The status update time-out value is a time-out period with reference to which it is determined that the startup is stopped in a case where the startup status in the startup status management table 301 is not updated even after a time period indicated by the status update time-out value 306 has elapsed. As the status update time-out value 306, a time period is designated which is long enough to complete the processing before the next update.

Figure 5:
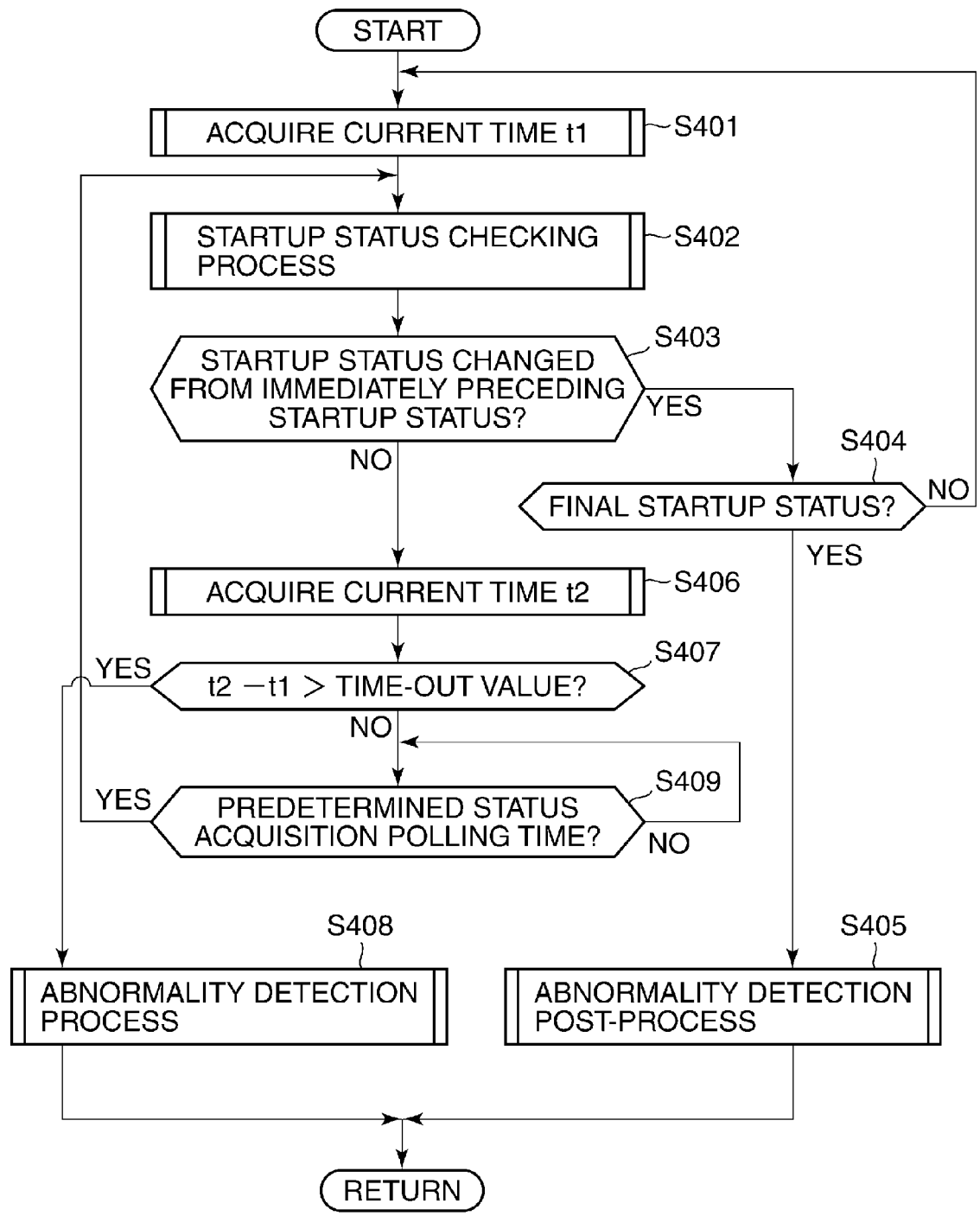
FIG. 5 is a flowchart of a startup monitoring process executed by the image forming apparatus shown in FIG. 1.

FIG. 5 is a flowchart of a startup monitoring process executed by the image forming apparatus shown in FIG. 1. Referring to FIGS. 1 and 5, each of the CPUs 108 and 117 performs determination of occurrence of an error according to the update of the startup status associated with the other of the CPUs 108 and 117.

When the startup monitoring process is started, the CPUs 108 and 117 each acquire a current time t1 from a timer (not shown) (step S401). Then, the CPUs 108 and 117 access predetermined memory addresses of the RAMs 109 and 118, respectively, to each acquire the startup status of the other of the CPUs (step S402: startup status checking process).

The CPUs 108 and 117 each check whether or not the startup status of the other of the CPUs has been changed from a preceding acquired startup status (step S403). If the startup status of the other of the CPUs has been changed from the preceding acquired startup status (YES to the step S403), the CPUs 108 and 117 each determine whether or not the number allocated to the changed startup status is a number indicative of the final (final number) (step S404). Then, if the number allocated to the changed startup status is not the final number (NO to the step S404), the CPUs 108 and 117 return to the step S401.

On the other hand, if the number allocated to the changed startup status is the final number (YES to the step S404), the CPUs 108 and 117 judge that the other of the CPUs has been normally started up, and perform an abnormality detection post-process, described hereinafter (step S405). Then, the CPUs 108 and 117 each terminate the startup monitoring process.

If the startup status of the other of the CPUs 108 and 117 has not been changed from the preceding acquired startup status (NO to the step S403), the CPUs 108 and 117 each acquire a current time t2 from the timer for determination of the start stop status (step S405).

Subsequently, the CPUs 108 and 117 perform startup halt determination (step S407). In determining a startup halt status, it is checked whether or not a time period elapsed without a change in the startup status (i.e. t2−t1) exceeds a predetermined associated status update time-out value before expiration of which the startup status is to be changed.

As described with reference to FIG. 4, the status update time-out value is updated when the startup status of the other of the CPUs is changed. For this reason, the CPUs 108 and 117 each acquire the status update time-out value from the startup status management table 301 in the step S402. Note that the status update time-out value can be changed with each startup stage.

If the time period indicated by the status update time-out value has elapsed without a change in the startup status (YES to the step S407), the CPUs 108 and 117 execute an abnormality detection process (step S408). In this process, the CPUs 108 and 117 each perform abnormality notification according to an abnormality detection determination table, referred to hereinafter. Then, the CPUs 108 and 117 each terminate the startup monitoring process.

On the other hand, if the time period indicated by the status update time-out value has not elapsed (NO to the step S407), the CPUs 108 and 117 each determine whether or not a predetermined status acquisition polling time has elapsed (step S409). If the predetermined status acquisition polling time has not elapsed (NO to the step S409), the CPUs 108 and 117 wait until the polling time elapses.

If the predetermined status acquisition polling time has elapsed (YES to the step S409), the CPUs 108 and 117 return to the step S402 to check the startup status again.

As described above, the CPUs 108 and 117 each read out the startup information from the memory space associated with the self-CPU to thereby monitor the startup status of the other of the CPUs. Then, the CPUs 108 and 117 each continue monitoring of the startup status of the other of the CPUs 108 and 117 until the startup status of the other of the CPUs 108 and 117 is updated within a predetermined time period and advances to the final status, or advances to an abnormal status due to time-out.

FIGS. 6A and 6B are a diagram showing an example of an abnormality detection determination table for use in abnormality notification in the abnormality detection process executed in the step S408 of the startup monitoring process shown in FIG. 5.

In FIGS. 6A and 6B, the illustrated abnormality detection determination table is stored e.g. in a nonvolatile memory. In the abnormality detection determination table, a startup halted position 601 indicates whether the abnormality is a halt of change in the startup status of the controller main unit 100 (M) or a halt of change in the startup status of the controller sub unit 101 (S). The startup halted position 601 further indicates which startup state of an associated one of the controller main unit 100 and the controller sub unit 101 has timed out.

A startup halt name 602 indicates a type and name of an abnormality which caused a time-out. A startup detection CPU 603 indicates which of the CPU 108 or 117 can detect the abnormality. An abnormality notification device 604 indicates an abnormality notification device which can be controlled by the CPU indicated by the startup detection CPU 603, for abnormality notification. A history holding location (information holding location) 605 indicates a nonvolatile device which can be controlled by the CPU indicated by the startup detection CPU 603, for storing the startup status of each of the CPUs 108 and 117.

Abnormality notification devices and nonvolatile devices which can be indicated by the abnormality notification device 604 and the history holding location 605 are not operable when an associated CPU is incapable of normal operation due to runaway or stall.

Further, the startup halted position 601 is slightly different depending on whether update of the startup stage detailed status 303 shown in FIG. 4 is configured to be executed. For example, when the startup halts during the OS service processing, if the update of the startup stage detailed status 303 is configured to be executed, M is sometimes updated from "4" to "5" during the OS service processing. On the other hand, in a case where the startup stage detailed status 303 is configured not to be updated, M is not updated to "5" until the processing is completed.

In FIGS. 6A and 6B, a startup error 606 (reference numerals 606 to 621 denote respective rows of startup error information in the abnormality detection determination table) indicates a case where the CPU 108 cannot be started up due to an abnormality which has occurred during execution of the BIOS. In this case, an abnormality notification device is the electric power status LED 103 which flashes once repeatedly at short time intervals. Further, in this case, history holding processing cannot be performed.

A startup error 607 indicates a case where the CPU 108 cannot be started up due to an abnormality which has occurred during execution of the boot loader. In this case, the CPU 108 controls the electric power status LED 103 as the abnormality notification device such that it flashed twice repeatedly at short time intervals, and halts the startup. In this case, the CPU 108 stores the contents of the above-mentioned startup status management table in the flash ROM 110.

A startup error 608 indicates a case where the CPU 108 cannot be started up due to an abnormality which has occurred during execution of the kernel. In this case, the CPU 108 controls the electric power status LED 103 as the abnormality notification device such that it flashes three times repeatedly at short time intervals, and halts the startup. In this case, the CPU 108 stores the contents of the above-mentioned startup status management table in the flash ROM 110.

A startup error 609 indicates a case where the CPU 108 cannot be started up due to an abnormality which has occurred during processing for starting the CPU 117. In this case, the CPU 108 controls the LCD panel 104 as the abnormality notification device to display error information, such as "Boot Error [M=3/S=0]", which is not language-localized, on the LCD panel 104, and halts the startup. In this case, the CPU 108 stores the contents of the above-mentioned startup status management table in the flash ROM 110.

A startup error 610 indicates a case where the CPU 108 cannot be started due to an abnormality which has occurred during the OS service startup process. In this case, the CPU 108 controls the LCD panel 104 as the abnormality notification device to display error information, such as "Boot Error [M=4/S=0]", which is not language-localized, on the LCD panel 104, and halts the startup. In this case, the CPU 108 stores the contents of the above-mentioned startup status management table in the flash ROM 110.

A startup error 611 indicates a case where the CPU 117 cannot be started due to an abnormality which has occurred during the OS startup process. In this case, the CPU 108 detects the abnormality of the CPU 117, and controls the LCD panel 104 as the abnormality notification device. Then, the CPU 108 causes error information, such as "Boot Error [M=5/S=1]", which is not language-localized, to be displayed on the LCD panel 104, and halts the startup. In this case, the CPU 108 stores the contents of the above-mentioned startup status management table in the flash ROM 110.

A startup error 612 indicates a case where the CPU 108 cannot be started due to an abnormality which has occurred during the electric power control startup process. In this case, the CPU 117 detects the abnormality of the CPU 108, and controls the in-execution LED 128 as the abnormality notification device such that it flashes five times repeatedly at short time intervals. Then, the CPU 117 halts the startup. In this case, the CPU 117 stores the contents of the above-mentioned startup status management table in the SRAM 125.

A startup error 613 indicates a case where the CPU 117 cannot be started up due to an abnormality which has occurred during the image processing control startup process. In this case, the CPU 108 detects the abnormality of the CPU 117, and controls the LCD panel 104 as the abnormality notification device to display error information, such as "Boot Error [M=5/S=2]", which is not language-localized, on the LCD panel 104, then halting the startup. In this case, the CPU 108 stores the contents of the above-mentioned startup status management table in the SRAM 125 via the bus bridge 116.

Referring to FIG. 6B, a startup error 614 indicates a case where the CPU 108 cannot be started up due to an abnormality which has occurred during the data processing control startup process. In this case, the CPU 117 detects the abnormality of the CPU 108, and controls the in-execution LED 128 as the abnormality notification device such that it flashes six times repeatedly at short time intervals. Then, the CPU 117 notifies the CPU 108 of the abnormality to cause the same to instruct the LCD panel 104 to display error information, such as "Boot Error [M=7/S=2]", which is not language-localized, and halts the startup. In this case, the CPU 117 stores the contents of the above-mentioned startup status management table in the SRAM 125.

A startup error 615 indicates a case where the CPU 117 cannot be started up due to an abnormality which has occurred during the engine startup process. In this case, the CPU 108 detects the abnormality of the CPU 117, and controls the LCD panel 104 as the abnormality notification device to display language-localized error information, such as "Startup error has occurred. [M=7/S=3]", on the LCD panel 104, and halts the startup. In this case, the CPU 108 stores the contents of the above-mentioned startup status management table in the SRAM 125 via the bus bridge 116.

A startup error 616 indicates a case where the CPU 108 cannot be started up due to an abnormality which has occurred during the job control startup process. In this case, the CPU 117 detects the abnormality of the CPU 108, and controls the in-execution LED 128 as the abnormality notification device such that it flashes eight times repeatedly at short time intervals. Then, the CPU 117 notifies the CPU 108 of the abnormality to cause the LCD panel 104 to display language-localized error information, such as "Startup error has occurred. [M=8/S=3]", and halts the startup. In this case, the CPU 117 stores the contents of the above-mentioned startup status management table in the SRAM 125.

A startup error 617 indicates a case where the CPU 117 cannot be started up due to an abnormality which has occurred during the facsimile initialization process. In this case, the CPU 108 detects the abnormality of the CPU 117, and controls the LCD panel 104 as the abnormality notification device to display language-localized error information, such as "A startup error has occurred. [M=8/S=4]", and halts the startup. In this case, the CPU 108 stores the contents of the above-mentioned startup status management table in the SRAM 125 via the bus bridge 116.

A startup error 618 indicates a case where the CPU 117 cannot be started due to an abnormality which has occurred during the startup final process. In this case, the CPU 108 detects the abnormality of the CPU 117, and controls the LCD panel 104 as the abnormality notification device to display localized error information, such as "A startup error has occurred. [M=9/S=E]", on the LCD panel 104, and halts the startup. In this case, the CPU 108 stores the contents of the above-mentioned startup status management table in the SRAM 125 via the bus bridge 116.

A startup error 619 indicates a case where the CPU 108 cannot be started up due to an abnormality which has occurred during the display and operation control initialization process. In this case, the CPU 117 detects the abnormality of the CPU 108, and controls the in-execution LED 128 as the abnormality notification device such that it flashes nine times repeatedly at short time intervals. Then, the CPU 117 notifies the CPU 108 of the abnormality to cause localized error information, such as "A startup error has occurred. [M=9/S=E]", to be displayed on the LCD panel 104, and halts the startup. In this case, the CPU 117 stores the contents of the above-mentioned startup status management table in the SRAM 125.

A startup error 620 indicates a case where the CPU 108 cannot be started up due to an abnormality which has occurred during the network control initialization process. In this case, the CPU 117 detects the abnormality of the CPU 108, and controls the in-execution LED 128 as the abnormality notification device such that it flashes ten times repeatedly at short time intervals. Then, the CPU 117 notifies the CPU 108 of the abnormality to cause the LCD panel 104 to display graphical service error information, and halts the startup. In this case, the CPU 117 stores the contents of the above-mentioned startup status management table in the SRAM 125.

A startup error 621 indicates a case where the CPU 108 cannot be started up due to an abnormality which has occurred during the PDL control initialization process. In this case, the CPU 117 detects the abnormality of the CPU 108, and controls the in-execution LED 128 as the abnormality notification device such that it flashes eleven times repeatedly at short time intervals. Then, the CPU 117 notifies the CPU 108 of the abnormality to cause the LCD panel 104 to display graphical service error information, and halts the startup. In this case, the CPU 117 stores the contents of the above-mentioned startup status management table in the SRAM 125. Then, the CPU 108 notifies the service center of the abnormality based on the notified service error information via the LAN 102.

Next, a description will be given of an abnormality detection post-process after the image forming apparatus shown in FIG. 1 has been normally started up.

Figure 7:
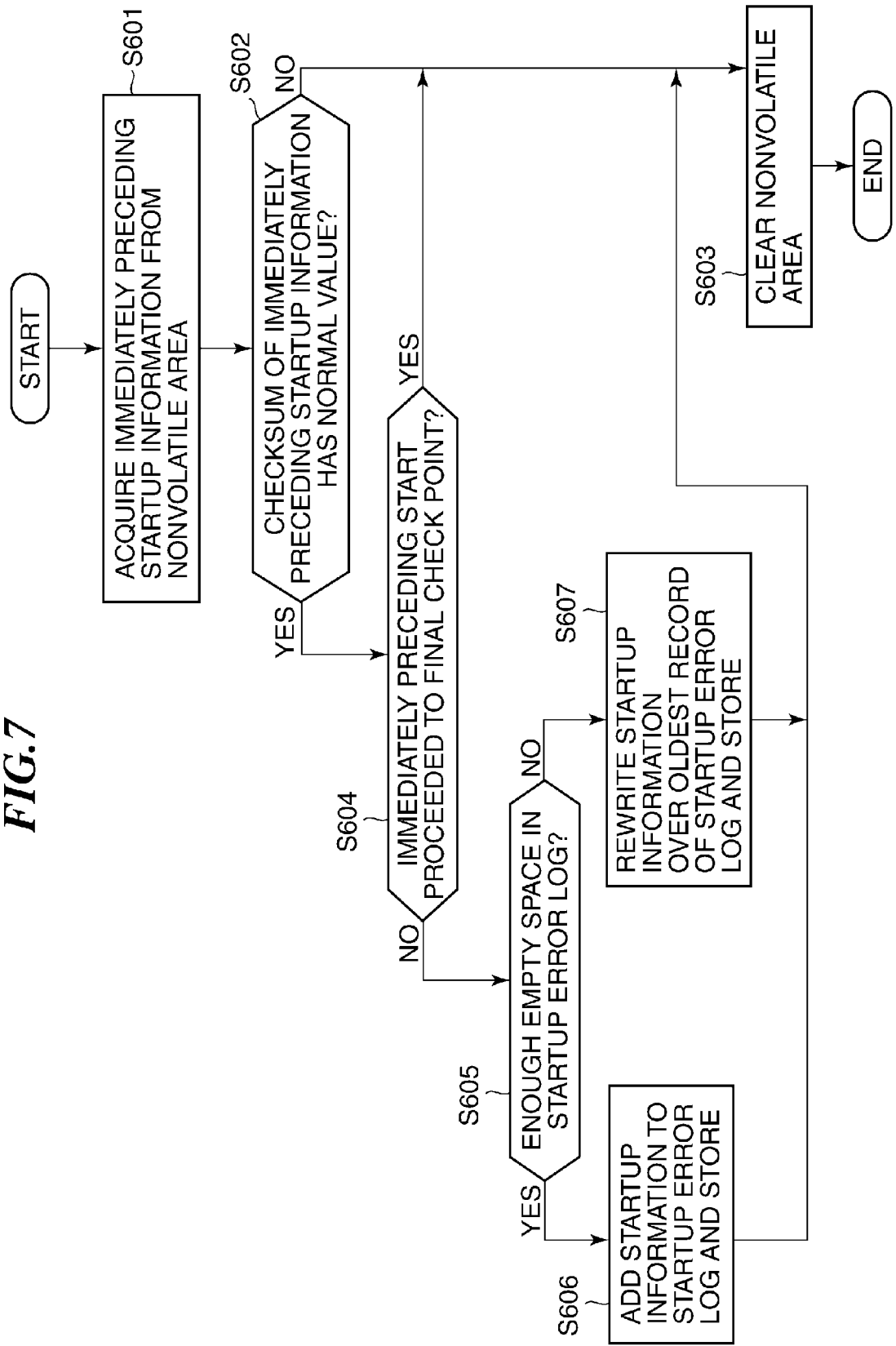
FIG. 7 is a flowchart of an abnormality detection postprocess executed after the image forming apparatus shown in FIG. 1 has been normally started up.

FIG. 7 is a flowchart of the abnormality detection post-process executed after the image forming apparatus shown in FIG. 1 has been normally started up.

Referring to FIGS. 1 and 7, in general, a startup error in the image forming apparatus is caused by not only floating dust and a contact failure, but also uncertainties, such as temperature and humidity. Therefore, as the on/off operation is repeatedly executed, it sometimes occurs that the image forming apparatus is successfully started. In such a case, it is necessary to retrieve the startup status information stored at the time of error detection in the startup process, and records the retrieved information as a log.

After the CPU 108 has been started as described above, the CPU 108 accesses a predetermined address (location) in the flash ROM 110 and the SRAM 125 to retrieve the startup status record (startup status information) into the RAM 109 (step S601).

Next, the CPU 108 calculates a checksum from the startup stage information 302 to the startup stage change time information 305 (if the status update time-out value has been stored, the time-out value is included). The CPU 108 compares the calculated checksum with the checksum information 307. That is, the CPU 108 determines whether or not the checksum information in the immediately preceding startup information is a normal value (step S602). In this step, the CPU 108 determines whether or not effective information has been recorded in the startup information.

If the calculated checksum does not match the checksum information 307 (NO to the step S602), the CPU 108 judges that effective information has not been recorded in the startup information, and clears the startup information (step S603). Then, the CPU 108 terminates the abnormality detection post-process.

On the other hand, if it is determined that the checksum information is normal (YES to the step S602), the CPU 108 checks the contents of the startup information. In this step, the CPU 108 checks whether or not the startup process on the immediately preceding occasion has proceeded up to the final check point (step S604). That is, the CPU 108 determines whether or not the startup process has been normally terminated by the controller main unit 100 and the controller sub unit 101.

If the startup process has been normally terminated by the controller main unit 100 and the controller sub unit 101 (YES to the step S604), the CPU 108 proceeds to the step S603, wherein the startup information is cleared.

If the startup process has been abnormally terminated by one of the controller main unit 100 and the controller sub unit 101 (NO to the step S604), the CPU 108 determines whether or not there is an empty space in the startup error log in the HDD 111 enough to preserve information on the abnormal termination as history information (step S605). If there is an enough empty space in the startup error log (YES to the step S605), the CPU 108 adds the startup information to the startup error log, and stores the same (step S606). Then, the CPU 108 proceeds to the step S603, and clears the startup information recorded in the nonvolatile memory.

If there is not an enough empty space in the startup error log (NO to the step S605), the CPU 108 writes and stores the startup information read out from the nonvolatile memory over the oldest record stored in the startup error log (step S607). The CPU 108 proceeds to the step S603, wherein the startup information recorded in the nonvolatile memory is cleared.

As described above, in the present embodiment, when the image forming apparatus includes the controller main unit 100 and the controller sub unit 101, one of the CPUs records the startup information of the one of the CPUs in the RAM physically connected to the other of the CPUs. Then, the other of the CPUs monitors the update of the startup information.

By doing this, even when the processing of the CPU is stopped due to a failure related to the hardware, it is possible to positively record information useful for analyzing a cause of occurrence of the startup error. Further, it is possible to notify an operator of the startup error information by an optimal device according to the startup stage, using a CPU in which the startup error has not occurred.

That is, in the present embodiment, the memory devices are separately connected to the CPUs, and the CPUs each access the memory device of the other CPU to record a condition of the startup halt (startup information) caused by an abnormality of the memory device, and each detect a startup error according to the startup information.

As a result, even when one of the CPUs is halted or causes a startup error, such as a memory corruption due to an abnormal operation, the other of the CPUs refers to the self-memory without being affected by the memory corruption, whereby it is possible to detect a state in which the start has not normally proceeded. Further, it is possible to perform abnormality notification according to the startup status of the other CPU and the startup status of the self-CPU, i.e. it is possible to perform minimum abnormality notification in an early stage of the startup, and perform high-level abnormality notification using e.g. an e-mail or a Web in a latter stage of the startup.

As is clear from the above description, in FIG. 1, the controller main unit 100 and the controller sub unit 101 each serve as a controller, and these controllers share job processing. Further, the CPU 108, the CPU 117, and the bus bridge 116 function as an access unit. Further, the CPUs 108 and 117 each function as an identification unit, a writing unit, and an abnormality detection unit. Further, the LCD panel 104, the electric power status LED 103, and the in-execution LED 128 each function as an indication unit, and the CPUs 108 and 117 each function as a notification unit and a notification determining unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, by configuring a control method such that steps thereof correspond to the functions of the present embodiment, the control method may be executed by an information processing apparatus. Further, a program having the functions of the above-described embodiment may be configured as a control program, and the control program may be executed by a computer included in the information processing apparatus. The control program is recorded e.g. in a computer-readable storage medium.

At this time, the control method and the control program each include at least a startup stage identifying step, a writing step, and an error detecting step.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

This application claims the benefit of Japanese Patent Application No. 2011-104367, filed May 9, 2011, which is hereby incorporated by reference herein in its entirety.

What is claimed is:

1. An information processing apparatus that includes at least two controllers, each of which shares job processing, comprising:
memory devices which are connected to the controllers, respectively; and
an access unit for accessing from one of the controllers to one of said memory devices which is connected to the other of the controllers,
wherein each of the at least two controllers comprises an identification unit, a writing unit, and an abnormality detection unit,
the identification unit of one of the at least two controllers identifies a startup stage to which the startup process has proceeded during the startup of the one of the at least two controllers;
the writing unit of the one of the at least two controllers writes startup stage identified by the identification unit as startup information into said memory device connected to the other of the at least two controllers by said access unit; and
the abnormality detection unit of the one of the at least two controllers detects whether or not an abnormality has halted the startup of the other of the at least two controllers with reference to the startup information written into said memory device connected to the one of the at least two controllers.

2. The information processing apparatus according to claim 1, wherein if the startup information is not updated within a predetermined time period, the abnormality detection unit determines that an abnormality has occurred in the startup of the other controller.

3. The information processing apparatus according to claim 1, further comprising indication units that are connected to the controllers, respectively, and are each configured to indicate an abnormality, and
wherein each of the at least two controllers has a notification unit configured to be operable when the abnormality is detected in the startup of the other controller by the abnormality detection unit, to notify the abnormality by the indication unit connected to the controller whose startup has not been halted.

4. The information processing apparatus according to claim 1, further comprising indication units that are connected to the controllers, respectively, and are each configured to indicate an abnormality, and
wherein each of the at least two controllers has a notification unit configured to be operable when the abnormality is detected in the startup of the other controller by the abnormality detection unit, to notify the abnormality by the indication unit connected to the other controller.

5. The information processing apparatus according to claim 1, wherein the abnormality detection unit determines a startup halt status of the other controller according to the startup information, and
the information processing apparatus further comprising a notification determining unit configured to determine whether or not to notify an abnormality to the other controller according to the startup halt status.

6. A method of controlling an information processing apparatus including at least two controllers to which memory devices are connected, respectively, each of the at least two controllers sharing job processing, and an access unit for accessing from one of the controllers to one of the memory devices which is connected to the other of the controllers, comprising:
identifying a startup stage to which the startup process of one of the at least two controllers has proceeded during the startup of the one of the at least two controllers;
writing a startup stage identified by said identifying as startup information into one of the memory devices connected to the other of the at least two controllers by the access unit; and detecting whether or not an abnormality has halted the startup of the other of the at least two controllers with reference to the startup information written into the memory device connected to the one of the at least two controllers.

7. A non-transitory computer-readable storage medium storing a computer-executable program for executing a method of controlling an information processing apparatus including at least two controllers to which memory devices are connected, respectively, each of the at least two controllers sharing job processing, and an access unit for accessing from one of the controllers to one of the memory devices which is connected to the other of the controllers, wherein the control method comprises:

identifying a startup stage to which the startup process of one of the at least two controllers has proceeded during the startup of the one of the at least two controllers;

writing a startup stage identified by said identifying as startup information into one of the memory devices connected to the other of the at least two controllers by the access unit; and detecting whether or not an abnormality has halted the startup of the other of the at least two controllers with reference to the startup information written into the memory device connected to the one of the at least two controllers.

* * * * *